(No Model.)

W. P. HINSON.
WIRE SPLICER AND TIGHTENER.

No. 319,716. Patented June 9, 1885.

Witnesses:
J. W. Garner
E. M. Kroger

Inventor:
W. P. Hinson
per J. A. Lehmann, att.

UNITED STATES PATENT OFFICE.

WILLIAM POPE HINSON, OF NASHVILLE, MISSOURI.

WIRE SPLICER AND TIGHTENER.

SPECIFICATION forming part of Letters Patent No. 319,716, dated June 9, 1885.

Application filed September 11, 1884. (No model.)

*To all whom it may concern:*

Be it known that I, W. P. HINSON, of Nashville, in the county of Barton and State of Missouri, have invented certain new and useful Improvements in Implements for Fastening and Tightening Barbed Wires; and I do hereby declare the following to be a full, clear, and exact description of the invention, such as will enable others skilled in the art to which it pertains to make and use it, reference being had to the accompanying drawings, which form part of this specification.

My invention relates to an improvement in implements for attaching the ends and tightening the wires of barbed fences; and it consists, first, in an implement for tightening the wires of a fence, composed of a lever which is provided with a cylindrical projection near one end, and two clamping-levers which are placed at opposite sides of the projection and which clamp the wires against it, substantially as shown; second, in an implement for tightening the wires of a wire fence, consisting of a lever provided with a cylindrical projection, having its outer end inclined so as to force off the wire, and two clamping-jaws, which are placed on opposite sides of the projection, substantially as described.

The object of my invention is to produce an implement by means of which the two ends of the wires of a barbed fence can be readily and quickly fastened together, and the wire stretched to any desired degree at the same time.

Figure 1:
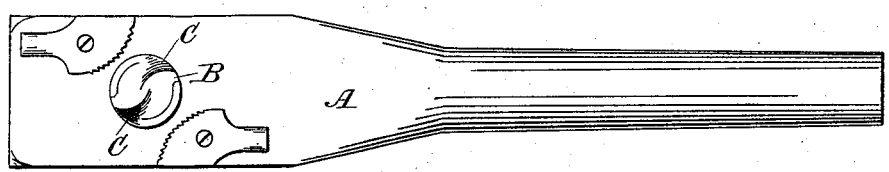
Figure 2:
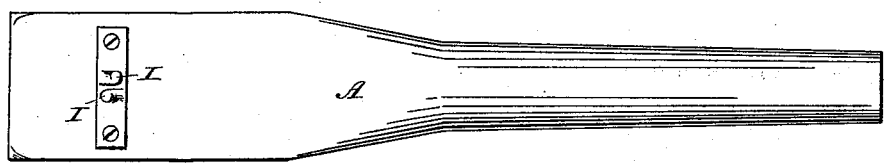
Figure 3:
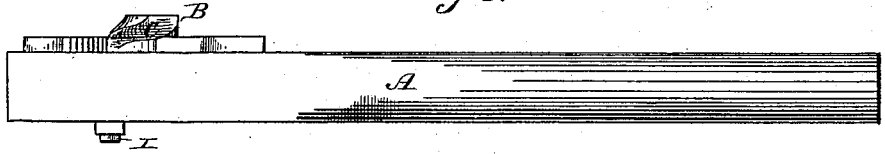

Figure 1 is a plan view of an implement embodying my invention, showing the devices for attaching the ends and tightening the wires. Fig. 2 is a similar view of the implement, taken from the opposite side, showing the means for tightening the wires. Fig. 3 is an edge view of the implement.

A represents a lever of any suitable length and construction, to which upon one side is secured the cylindrical projection B. This projection may be of any desired size, and has two spirals, C, extending around its sides to the top, for the purpose of forcing the ends of the wires off while they are being twisted together. Pivoted to the lever, upon opposite sides of this cylindrical projection, are the two cam-ratchets, which operate in opposite directions, and which serve to keep and hold the two ends of the wires which are to be fastened together. The two ends of the wires are passed between the ratchets and the sides of the cylinder. The ratchets are made to engage with the wire and then the implement is turned to the left, winding both ends around the cylindrical projection at the same time and twisting them, for the purpose of both fastening them together and stretching the wires. The turning movement can be continued until the wires have been sufficiently tightened. The two inclined surfaces or spirals upon the cylindrical projection serve to force the wires off of the cylinder as the twisting continues. By this means the two ends of the wires can be quickly and readily fastened together and the wires stretched to any desired degree. Upon the opposite side of the lever to the cylindrical projection, as shown in Fig. 2, are formed the two projections, I, which are placed out of line with each other, and between which the wire which is to be tightened is passed. By turning the lever the projections catch against opposite sides of the wire and cause the wire to wrap around them, forming first two complete circles or rings, and then as the turning of the lever is continued the wire is twisted together. These two rings and the twisting of the wire take up the slack that is in the wire and tighten it to any desired degree. These projections I are old, and are not therefore claimed as new in this application.

Having thus described my invention, I claim—

1. An implement for tightening the wires of a fence, composed of a lever which is provided with a cylindrical projection, and two catches, which are placed upon opposite sides of the projection, substantially as shown.

2. An implement for tightening the wires of a wire fence, consisting of a lever provided with a cylindrical projection having two inclines formed upon it, and two catches, which are placed on opposite sides of the projection, substantially as described.

In testimony whereof I affix my signature in presence of two witnesses.

WILLIAM POPE HINSON.

Witnesses:
LEWIS BALDWIN,
J. G. PORTER.